3,189,463
PROCESS FOR PRODUCING COMPRESSED FROZEN SLICES OF BAKED CELLULAR PRODUCTS
W Bartlett Jones, 38 S. Dearborn St., Chicago, Ill.
No Drawing. Filed Dec. 21, 1961, Ser. No. 161,284
17 Claims. (Cl. 99—86)

The present invention relates to baked cellular cereal products, such as bread, English muffins, biscuits, cakes and the like, and in particular, to a compressed and frozen form thereof.

The term "baked cellular cereal products" as used herein refers to moist baked products raised by yeast or baking powder.

Ordinary baked cellular cereal products, such as bread, muffins, biscuits, and cake, are bulky. Bread slices in particular are in great demand for sandwiches and for receipt of spreads. Slices of plain bread are difficult to spread unless the spread is very soft. Non-soft spreads tear the bread in attempts to apply the spread.

I have discovered in particular that slices of ordinary bread may be greatly compressed flatwise and frozen in compressed form between compression platens. The frozen bread may then be released, and it retains its compact form while frozen. However, on thawing, the slice expands approximately to its original volume and texture. In compressing, the major portion of the crust which extends perpendicular to the plane of the slice shifts toward a parallel position, and on thawing, returns to approximately its original position. Portions of the crust may not so shift and such portions when edgewise compressed and not return to normal position. However, the thawed frozen slice is nearly like the original slice, except for such portions of the crust. Where there are creases or sharp corners in the crust, cutting through the crust at such locations minimizes edgewise compression of the crust.

The bread may be from a loaf previously frozen without compression or one which is fresh from the bakery or store. Cake slices, and English muffins and biscuits are likewise responsive.

The frozen slice permits application of soft and stiff plastic spreads, especially chilled butter which is difficult to apply to an ordinary slice. Thus, sandwiches may be more easily made and wrapped while the slices are still frozen to provide a degree of refrigeration in a conventional manner such as any housewife does in preparing lunches to go. The wrapped frozen sandwiches then thaw in the wrapper, and may tightly pack themselves in the wrapper by expansion, of course, depending upon the manner of wrapping, and the character of the wrapping material. This wrapper may be expansible by using creped material, or by providing reverse folds or pleats to allow expansion in the facewise direction of the sandwich.

An entire loaf of bread may be compressed endwise and frozen. English muffins may be compressed and frozen. However, these forms do not respond as well or as quickly in expansion as they thaw. Where the frozen product on thawing has an exposed cellular surface, and is relatively thin, the product returns closer to normal on thawing. Bread slices and split English muffins are examples.

A wrapped loaf of sliced bread as purchased in the market has been compressed, wrapper included, endwise to about one-quarter of the original length of the loaf. So compressed between platens, it was frozen, then thawed. The creased wrapper retarded expansion, the force to expand being slight.

On separating slices, they were irregular in shape, i.e., they were not planar slices, and some parts of the inside were torn. The forces of compression did not remain uniform from end to end resulting in uneven compression for individual slices. This disadvantage is avoided by compressing and freezing an unsliced loaf, thawing and then slicing. However, freezing individual compressed slices is preferred.

In the case of products such as English muffins, these are commonly sold already split in half. Best results are obtained by placing a partition between the two halves when compressing, then freezing, then exposing the cellular faces of the halves in thawing.

The extent to which compression may be carried for substantially complete return depends upon numerous factors, such as the freshness of the product, its moisture content, texture, and thickness of crust. It has been found that where compression is carried so far that the cellular texture of the frozen slice is practically lost with the appearance of a smooth texture, the expansion is greatly inhibited. The cell walls unite. In general, the products may be compressed to about 25% to 30% of the original thickness, for returning usefully toward the precompressed state.

When a frozen compressed product, such as a bread slice, has exposed cells enabling it to return on thawing to substantially its original thickness, it may be placed in frozen condition in a toaster or the like, and thawed and toasted therein, so as to appear like a toasted slice of never-frozen bread.

The invention has its practical utility for bread slices. A loaf can be baked which is several feet long, compared to present-day inches in length for marketed loaves. These long loaves may be sliced in the bakery, or elsewhere, and fed in sequence flatwise to compression means, frozen while compressed, then as released from the compression means, the frozen slices may be assembled facewise in the same sequence and packaged. End slices may thus be eliminated. Different sized packs of the frozen compressed slices may then be marketed along with other frozen products.

In commercial practice, a stream of uniformly thick slices may be passed through a freezer between continuously moving compressing belts separated by gauges to control and limit the degree of compression according to the original thickness and character of the slices. Apparatus may be used such as that described in U.S. Birdseye Patent No. 1,773,081 between two belts of which sealed packages are frozen, The degree of compression and the degree of expansion on thawing are related. The character of the crust is more controlling than the character of bread in the center. A freshly baked crust is brittle and an aged crust is more pliable. Whether or not all of the crust returns to normal is more a matter of appearance than of merit. It is the expansion of the body of the bread that draws the crust back toward normal position, and the expanded body has the normal appearance of a slice.

The invention in its preferred aspect contemplates the preparation and sale of bread and the like in compact form by freezing compressed slices, stacking them, and wrapping the stack. In order that the wrapped frozen stack may be allowed to thaw and expand, it is preferred that the wrapper be expansible in the direction of the stack. This may be done by providing creped or stretchable wrapper, or telescopic sections of wrapper, or wrappers with one or more reverse folds or pleats which open up as the stack expands.

Such expansible wrapped frozen products may be stored in freezers, thus reducing the space required when freezing ordinary loaves of bread or the like. For supplying airplanes with food, the compactness of space is a great advantage, and where the hostess may apply a spread, that duty is facilitated by spreading the frozen slices.

The invention is not limited to the matters described above for the purpose of illustration, and numerous embodiments and changes are contemplated as falling within the scope of the appended claims.

I claim:

1. A moisture-containing frozen compressed baked cellular cereal product characterized by expansibility on thawing.

2. A moisture-containing frozen facewise compressed slice of bread characterized by expansibility on thawing.

3. A moisture-containing frozen facewise compressed slice of bread having two faces with a cellular texture and characterized by expansibility on thawing.

4. A moisture-containing frozen facewise compressed slice of bread characterized by expansibility on thawing, and edible spread thereon.

5. A sandwich comprising at least two moisture-containing frozen facewise compressed slices of bread characterized by expansibility on thawing, and edible filler between two slices.

6. A sandwich comprising at least two moisture-containing frozen facewise compressed slices of bread characterized by expansibility on thawing, and edible spread on at least one of the inner bread faces.

7. A package comprising a plurality of moisture-containing frozen facewise compressed slices of baked cellular cereal product characterized by expansibility on thawing and stacked in face-to-face position, and a wrapper therefor enclosing the stacked slices.

8. A package comprising a plurality of moisture-containing frozen facewise compressed slices of bread stacked in face-to-face position, said slices being characterized by expansibility on thawing, and a wrapper therefor enclosing the stacked slices.

9. A package comprising a plurality of moisture-containing frozen facewise compressed slices of baked cellular cereal product characterized by expansibility on thawing, said slices being stacked in face-to-face position, and means enclosing said stacked slices, said means being expansible in the direction of the stacked slices to accommodate expansion of the slices on thawing.

10. A package comprising a plurality of moisture-containing frozen facewise compressed slices of bread characterized by expansibility on thawing, said slices being stacked in face-to-face position, and means enclosing said stacked slices, said means being expansible in the direction of the stacked slices to accommodate expansion of the slices on thawing.

11. A package comprising at least one sandwich, said sandwich comprising at least two moisture-containing frozen facewise compressed slices of bread characterized by expansibility on thawing, and a wrapper enclosing the same, said wrapper being expansible to accommodate increasing thickness of the slices on thawing.

12. The method which comprises compressing a moisture-containing baked cellular cereal product with retention of its cellular structure, freezing the compressed product while holding the product against expansion, and releasing the frozen product, whereby said product retains its compact form while frozen, the extent of compression being such as to effect a substantial reduction from original volume and such that on thawing the cellular structure expands substantially to said original volume.

13. The method which comprises facewise compressing a substantially uniformly thick slice of a moisture-containing baked cellular cereal product with retention of its cellular structure, freezing the compressed slice while holding the slice against expansion, and releasing the frozen slice, whereby said slice retains its compact form while frozen, the extent of compression being such as to effect a substantial reduction from original volume and such that on thawing the cellular structure expands substantially to said original volume.

14. The method which comprises facewise compressing a substantially uniformly thick slice of moisture-containing bread with retention of its cellular structure, freezing the compressed slice while holding the slice against expansion, and releasing the frozen slice, whereby said slice retains its compact form while frozen, the extent of compression being such as to effect a substantial reduction from original volume and such that on thawing the cellular structure expands substantially to said original volume.

15. The method which comprises facewise compressing a substantially uniformly thick slice of moisture-containing bread with retention of its cellular structure, freezing the compressed slice while holding it against expansion, releasing the frozen slice, whereby the slice retains its compact form while frozen, the extent of compression being such as to effect a substantial reduction from original volume and such that on thawing the cellular structure expands substantially to said original volume, facewise stacking a plurality of such frozen slices, and wrapping the resulting stack.

16. The method which comprises facewise compressing a substantially uniformly thick slice of moisture-containing bread with retention of its cellular structure, freezing the compressed slice while holding it against expansion, releasing the frozen slice, whereby the slice retains its compact form while frozen, the extent of compression being such as to effect a substantial reduction from original volume and such that on thawing the cellular structure expands substantially to said original volume, facewise stacking a plurality of such frozen slices, and wrapping the resulting stack with a wrapper expansible in the direction of the stack.

17. A moisture-containing piece of a frozen compressed baked cellular cereal product having a face characterized by a cellular texture, said product being characterized by expansibility on thawing.

References Cited by the Examiner

UNITED STATES PATENTS

| | | | |
|---|---|---|---|
| 1,773,081 | 8/30 | Birdseye. | |
| 2,260,450 | 10/41 | Guinane | 99—192 |
| 2,834,677 | 5/58 | Geisler | 99—1 |
| 3,083,651 | 4/63 | Cooper | 99—86 X |

OTHER REFERENCES

"Scientific American," June 1943, page 265.
"Bakers Weekly," Nov. 9, 1959, pages 52–54.

A. LOUIS MONACELL, *Primary Examiner.*

ABRAHAM H. WINKELSTEIN, RAYMOND N. JONES, *Examiners.*